H. TIELKEMEYER.
BOILER FOR HEATING SYSTEMS.
APPLICATION FILED APR. 28, 1916.
1,195,749.
Patented Aug. 22, 1916.
4 SHEETS—SHEET 1.
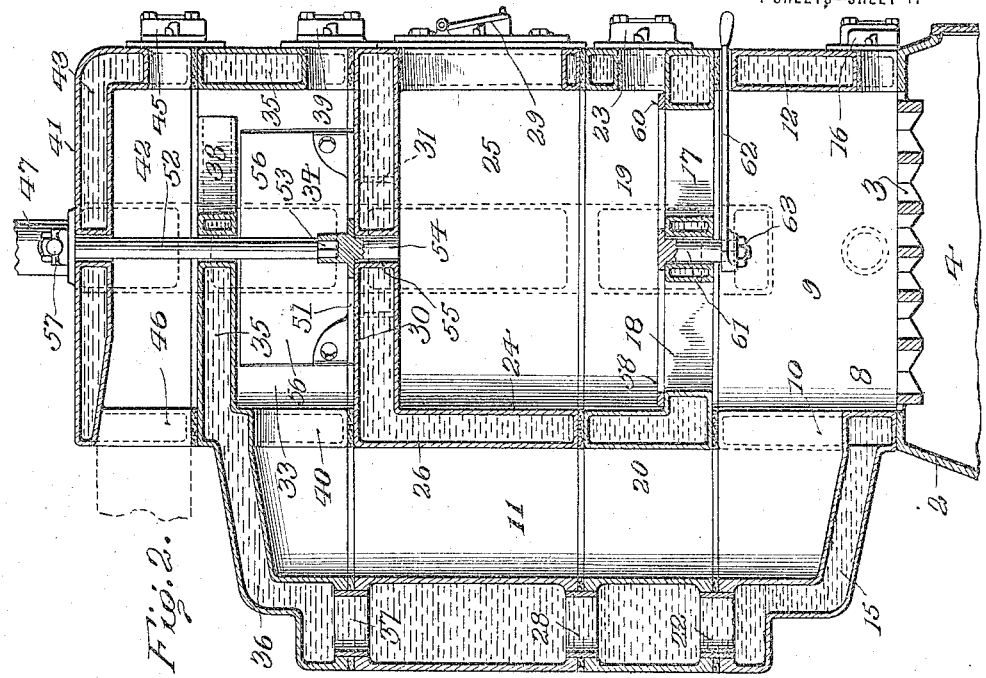
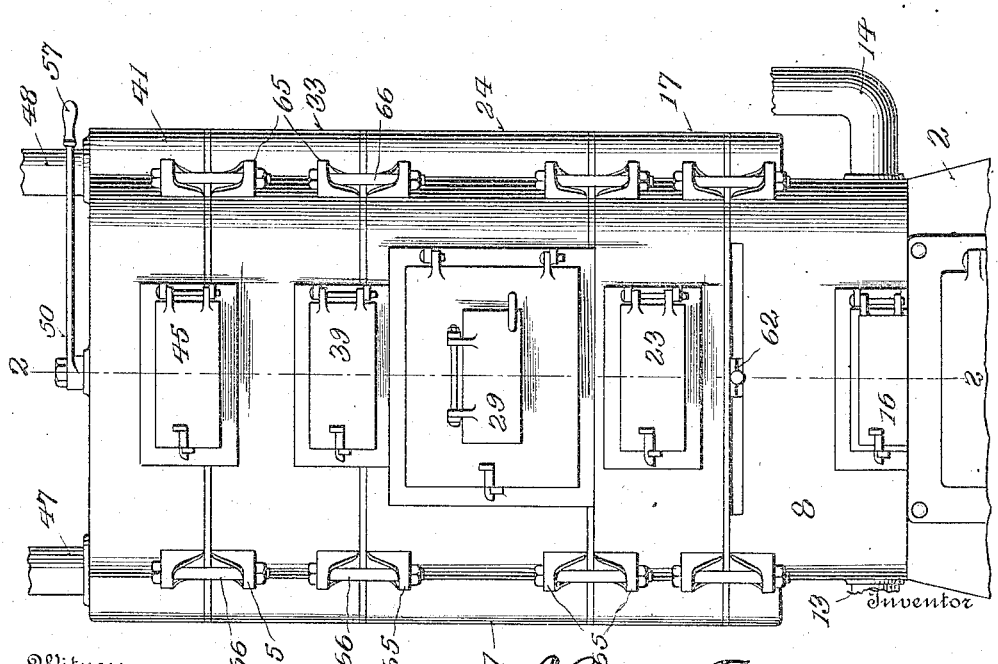

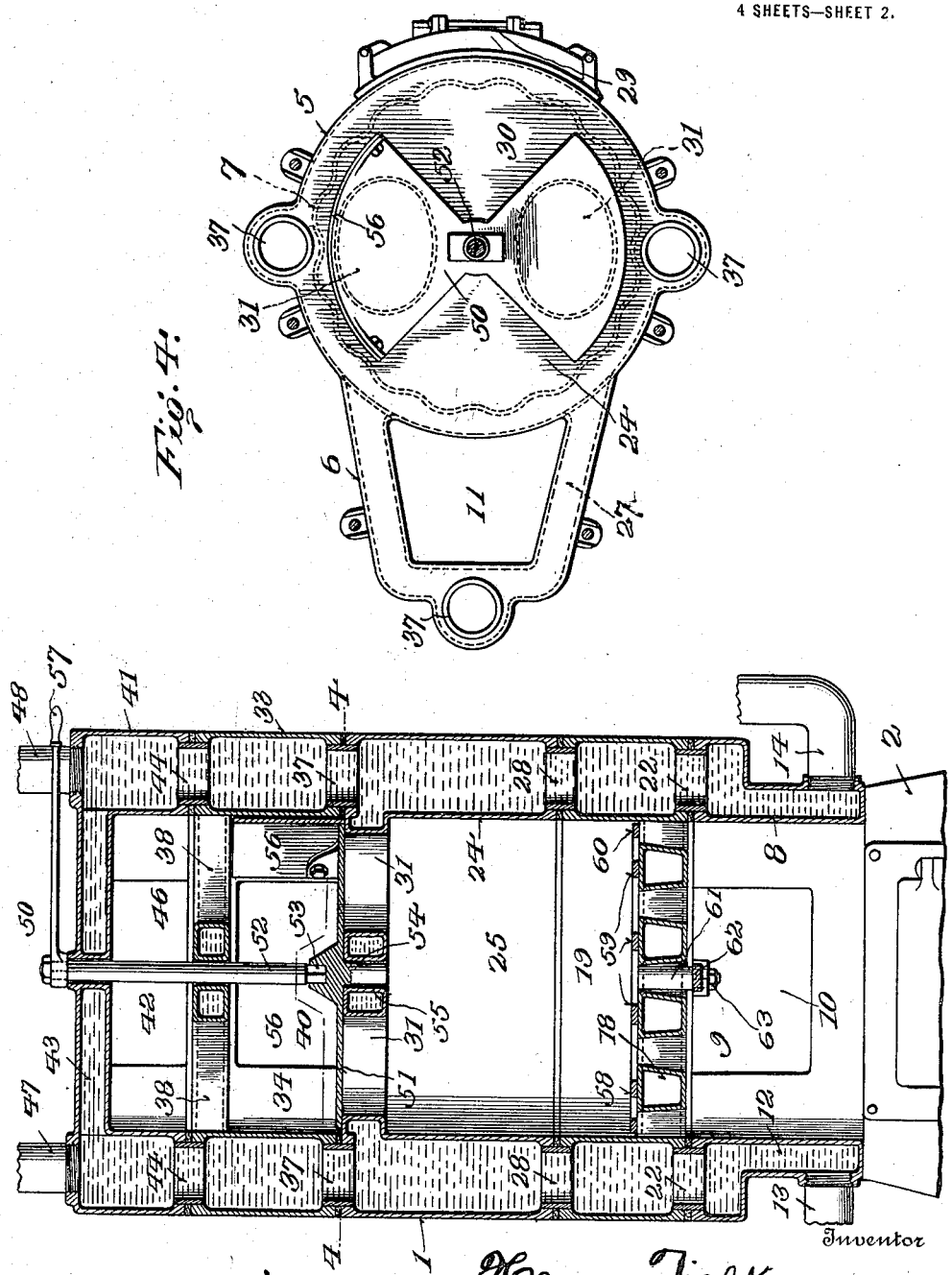

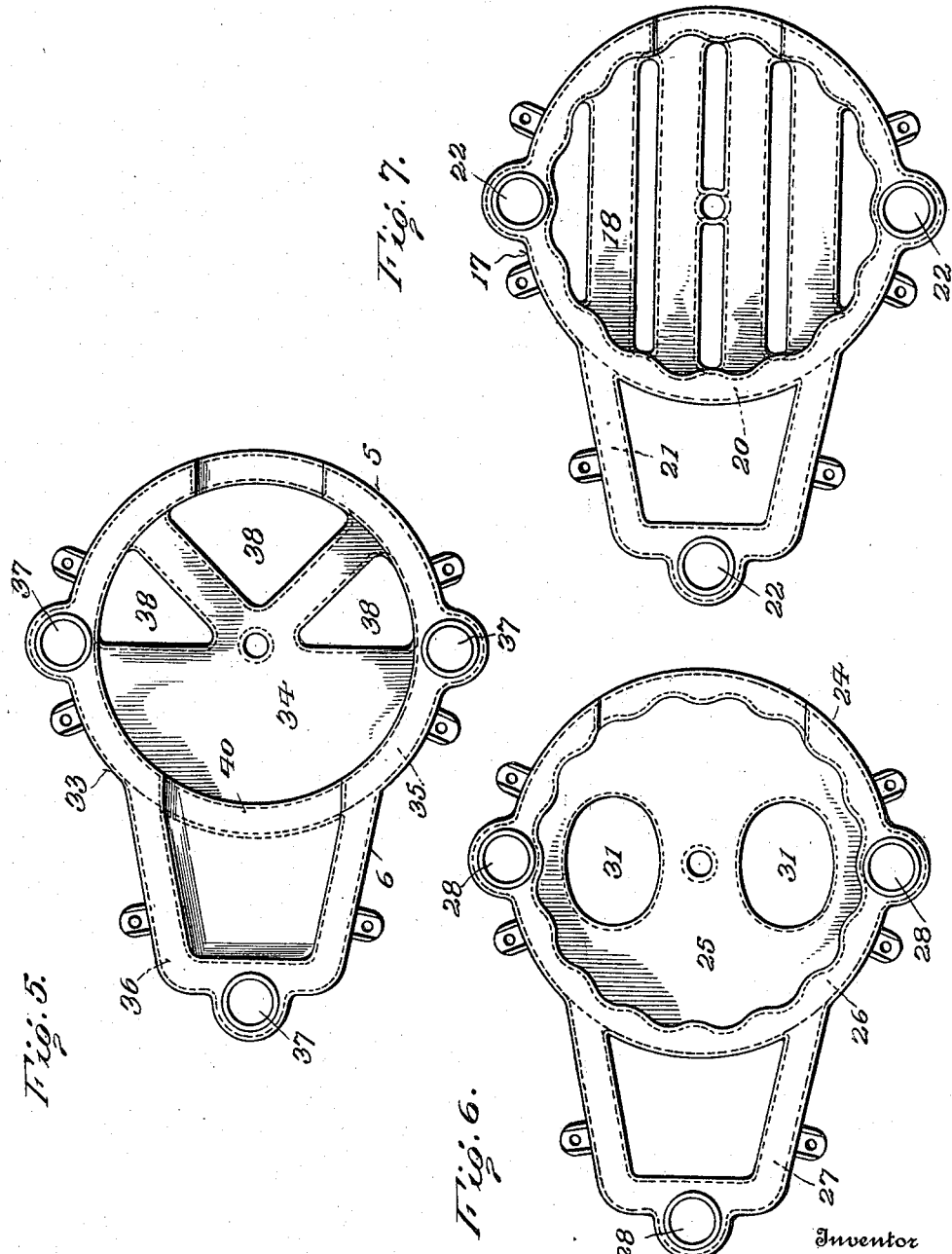

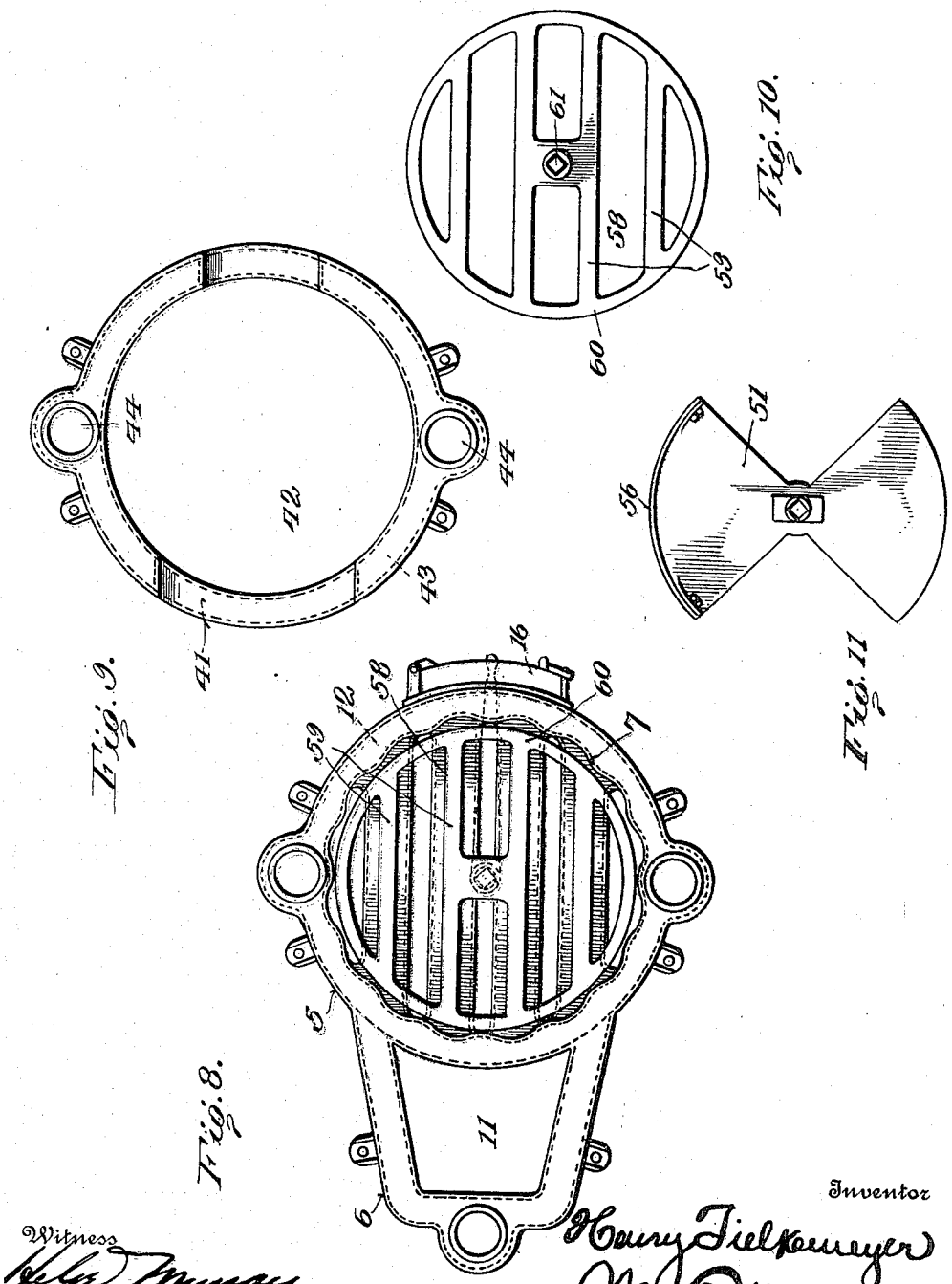

UNITED STATES PATENT OFFICE.

HENRY TIELKEMEYER, OF ST. LOUIS, MISSOURI.

BOILER FOR HEATING SYSTEMS.

1,195,749.  Specification of Letters Patent.  Patented Aug. 22, 1916.

Application filed April 28, 1916. Serial No. 94,194.

*To all whom it may concern:*

Be it known that I, HENRY TIELKEMEYER, a citizen of the United States, residing at St. Louis, in the State of Missouri, have invented certain new and useful Improvements in Boilers for Heating Systems; and I do hereby declare the following to be a full, clear, and exact description of the invention, such as will enable others skilled in the art to which it appertains to make and use the same.

This invention contemplates certain new and useful improvements in heating boilers and more especially that type embodying a plurality of superimposed water sections having suitable draft passages therethrough, as set forth in United States Letters Patent No. 1,144,798, granted to me June 29, 1915.

The present invention has for one of its objects the production of an efficient and economical boiler comprising a series of superimposed communicating water sections having arranged therethrough a plurality of maximum heat radiating passages for directing the flow of the products of combustion in either an upward or downward path as may be desired.

The invention has for another object the production of a boiler having means for controlling the direction of the draft or flow of the products of combustion, the said means including an operable connection extending upon the outside of said boiler within easy reach of the attendant.

Another object of this invention is to produce a convertible up and down draft boiler in which the circulating heating medium entirely surrounds the products of combustion, thereby securing the highest possible absorption of heat, irrespective of which draft passage is used.

A further object of the invention is the production of a boiler of the convertible up and down draft type, having a novel form of water grate positioned in one of the superimposed water sections whereby a maximum amount of heat can be absorbed.

A still further object of this invention is to produce a boiler embodying a combined water grate and regulating shaker element positioned thereon, the said shaker element being readily removable and easily adjusted thereon, as will more fully hereinafter appear.

With these and other objects in view the invention further consists in the novel arrangement and combination of parts hereinafter described and pointed out in the appended claims.

In the drawings which show by way of illustration an embodiment of my invention, Figure 1 is a front elevation of my improved heating boiler showing the manner in which the superimposed sections are bolted together. Fig. 2 is a vertical sectional view on the line 2—2 of Fig. 1. Fig. 3 is a vertical sectional view taken at right angles to Fig. 2 of the heating boiler. Fig. 4 is a horizontal sectional view through the heating boiler on the line 4—4 of Fig. 3. Fig. 5 is a detail plan view of one of the superimposed water sections which shall hereinafter be referred to as the upper intermediate section. Fig. 6 is a plan view of the central or major superimposed water section having suitable openings or passages therethrough which are closed and opened to control the direction of draft of the boiler. Fig. 7 is a plan view of one of the superimposed water sections, embodying the water grate, which shall be hereinafter referred to as the lower intermediate or water grate section. Fig. 8 is a horizontal sectional view through the said water grate section showing the shaking element positioned on the water grate. Fig. 9 is a plan view of the uppermost or top section of the boiler. Fig. 10 is a detail plan view of the shaking element, and Fig. 11 is a detail plan view of the damper or controlling means for connecting the boiler into an up draft or down draft boiler.

In the production of a boiler of this type it has been found that a peculiar combination of superimposed hollow water sections arranged to permit the products of combustion to baffle and tortuously circulate therethrough, relatively reduces the amount of fuel consumed and increases the percentage of efficiency of the boiler. Likewise, the convertibility of the passage of the products of combustion adds materially to the maximum absorption of heat by the circulating medium, as will be readily understood. The present invention has, therefore, been designed to include a series of superimposed hollow water sections suitably positioned upon a lower or basic section which preferably consists of the usual ash box and grate of any well known construction.

The boiler as a unit consisting of the respective superimposed hollow connecting water sections will be described as including a bottom section arranged on the lowermost or basic ash box section; a lower intermediate or water grate section positioned on the bottom section; a central or major section fitted upon the lower intermediate section; an upper intermediate section positioned upon the central or major water section, and a top or uppermost section arranged upon the upper intermediate section.

Referring to the drawings, in which similar parts are designated by corresponding reference characters, the boiler unit 1 is positioned upon a suitable base 2, which may be provided with the usual grate bars 3, and ash pit 4. These elements may be of any well known construction and a further description thereof will be dispensed with. The boiler unit 1 is of circular double shell formation indicated at 5, with an extending substantially rectangularly shaped similar shell formation indicated at 6, arranged in the rear of the boiler and extending upward to the top section. The circular double shell 5 may be internally corrugated or otherwise similarly shaped as at 7 for purposes of absorbing a maximum amount of heat.

The superimposed water sections communicate with each other and the circulating medium has a free passage between the double walls or shells, as will be readily understood. Referring to the respective water sections, the bottom section 8 is provided with the interior heating chamber 9, and a passageway 10 communicating with the vertical draft flue 11 extending upwardly through the substantially rectangular shell portion 6 of the boiler. A chamber 12 is provided between the double wall construction of the water section and receives the returning heating medium from the system through pipe connections 13 and 14, see Figs. 1, 2 and 3. A chamber 15 is formed between the double walls of the adjacent rectangular portion of this bottom section 8 and communicates with the chamber 12 as shown. A door 16 is shown provided in the bottom water section.

The lower intermediate or water grate section 17 is positioned upon the bottom section 8 and is provided with the hollow water grate 18. The water grate comprises a plurality of longitudinally extending bars of substantially rectangular cross section having slightly tapered sides, as shown in Fig. 3. While these sections are shown as of substantially rectangular formation, it will be understood that various other cross sectional areas can be substituted such as a square, hexagonal, diamond, irregular oval, egg-shaped, etc., provided the general contour adheres to the design of an inverted pyramid. A heating chamber 19 is provided in this section above the water grate, and the encircling chamber 20 between the double wall construction receives the heating medium in a like manner to the bottom section. The chamber 21 encircling the flue 11 is similar to that of chamber 15 and communicates therewith through the passage 22, as shown in Fig. 2. A door 23 is provided in this section above the water grate.

The central or major section 24 of the boiler is positioned upon the lower intermediate or water grate section and is provided with an interior heating chamber 25, around and over which the chamber 26 extends between the double wall construction, as clearly shown in Figs. 2 and 6. The chamber 27 encircles the flue 11, and establishes communication of the heating medium through the passageway 28 with the lower water section hereinbefore described. A double door construction 29 is provided in this central or major section, as shown in Figs. 1 and 2. The top 30 of this major water section into which chamber 27 extends, is provided with openings 31, see Figs. 4 and 6. These openings are used as draft passages for the products of combustion when the boiler is used as an up draft boiler. The opening and closing of these passageways 31 by the damper or valve controlling mechanism when converting the boiler into an up draft or down draft boiler will be described later.

The upper intermediate water section 33 (see Figs. 2, 3 and 5) is positioned upon the central or major water section 24, and is provided with an interior heating chamber 34 around and over which extends an encircling chamber 35 formed between the double wall construction. A chamber 36 encircles the upper portion of the flue 11, and communicates with the central or major water section through passageways 37. Provided in that portion of chamber 35 extending over the interior heating chamber 34 are passageways 38 through which pass the products of combustion (see Fig. 5 of the drawings.) These passageways are preferably arranged near the front of the boiler and are positioned out of alinement with the draft passageways 31 formed in the central or major water section, heretofore described. From this arrangement it will be apparent that a sufficiently baffling and tortuous path is provided for the products of combustion from which a maximum amount of heat can be absorbed. As shown in Fig. 2 of the drawings, the flue 11 communicates with the interior heating chamber 34 of this section through passageway 40. A door 39 is provided in the upper intermediate water section 33. The top or uppermost water section 41 (see Figs. 2, 3 and 9) is positioned upon the circular portion of the upper intermediate water section 33, and is provided with an interior heating chamber 42 around and over which extends the encircling heating medium chamber 43. This chamber 43 communicates with the chamber 35 of the upper intermediate water section 33 through passageways 44. A door 45 is provided in the top section 41 as shown. An opening 46 is provided at the rear of the top section 41 and communicates with a suitable chimney or draft passage as indicated by dotted lines in Fig. 2. Outlet openings 47 and 48 are also provided in this top section and provide for the circulation of the heating medium from the uppermost chamber 43 out into the system in the usual manner. Referring to Fig. 2 of the drawings, it will be seen that these series of superimposed water sections provide a boiler unit having maximum circulating passages for the heating medium and the products of combustion from which the heat is absorbed.

The damper or controlling mechanism 50 for converting the boiler into an up draft or down draft boiler will now be described. Referring to Figs. 2, 3, 4 and 5 of the drawings the said mechanism consists of a rotatable damper or covering plate 51 adapted to rest upon the upper surface of the central or major water section and to cover and uncover the openings 31 therein according to the draft desired. A vertical rod 52 is connected to the damper 51 and as shown is provided with a squared head 53 arranged to fit into a correspondingly shaped socket formed in the center of the said damper. A bearing stud 54 extends from the said damper plate 51 and turns in the opening 55 formed in the central or major water section as shown. An upstanding circular plate 56 is secured to the outer edge of one side of the damper 51 as shown, the purpose of which is to close the passageway 40 and cut off any communication with the flue 11 when the boiler is used as an up draft boiler. A suitable hand lever 57 extends from the top of the rod 52 outwardly over the top of the boiler and within easy reach of the attendant. From this construction it will be obvious that the damper or convertible controlling means can be readily operated according to the draft desired, as for example, should it be advisable to use the heater as an up draft boiler, the damper 51 is turned so as to uncover the openings 31 in the major water section thereby providing a direct upward draft through the water grate, major and upper water sections, as will be readily understood. When it is desired to use the boiler as a down draft heater, the damper 51 is turned to the position shown in Fig. 4 of the drawings, closing the openings 31 in the major water sections and directing the flow of the products of combustion downwardly through the water grate section through the passageway 10 into the flue 11, out through the passageway 40 into the chamber 34 of the upper intermediate water section and thence through openings 38 therein into chamber 42 of the top section and out into the chimney. The result of the use of these drafts is to substantially consume the great bulk of the products of combustion before the chimney outlet is reached, thereby providing a maximum absorption of heat by the surrounding heating medium chambers. The means for effectively securing a free and uninterrupted flow of these products of combustion consists of a shaker device 58 arranged upon the water grate, whereby all clinkers and other non-heat producing substances can be dislodged at intervals. This shaker element 58 comprises a series of parallel bars 59 arranged within a circular frame 60 (see Figs. 2, 3, 8 and 10). Depending from the center of the frame is a stub shaft 61 on the lower end of which is secured one end of a hand lever 62, by a readily removable nut connection 63. This lever 62 projects outwardly through an arcuate opening in the bottom water section of the boiler unit, and can be swung to either side for any predetermined distance. By this construction it will be apparent that the highest possible efficiency of the fuel can be obtained, and by virtue of the parallel arrangement of the bars 59 relatively positioned upon the parallel water grate bars a further draft adjustment can be obtained under varying conditions of the fuel used or the heat desired.

The means for securing the several superimposed water sections together includes a plurality of lugs 65 through which pass suitable draw-bolts 66, as clearly shown in Fig. 1. A sufficient number of such fastenings is provided in order to produce a non-leaking boiler unit. Suitable material may be used between the sections in order to further prevent any tendency of the boiler to leak, as shown in the drawings.

From the foregoing it will be seen that the present invention comprises a boiler unit consisting of a plurality of superimposed water and draft sections, designed and positioned to effectively direct the flow of the products of combustion in either an upward or downward direction, a series of communicating heating medium chambers entirely surrounding the said draft passages, and suitable damper and shaker devices associated with the said respective draft passages whereby the highest possible draft regulation can be easily and effectually obtained.

Having thus described my invention, what I claim and desire to secure by Letters Patent is:

1. A boiler of the class described consisting of a plurality of horizontally arranged superimposed hollow water sections through which a heating medium circulates, the said water sections including a central major water section having a vertical flue therein, intermediate water sections arranged above and below the said major water section, a bottom water section arranged beneath the lower intermediate water section, a top water section positioned upon the upper intermediate section, a vertical flue extending from the said bottom water section to the upper intermediate water section, an adjacent flue communicating with said flue and extending to the outside of the boiler, and means interposed between the vertical flue in the major water section and the aforesaid flues for directing the flow of the products of combustion through said boiler.

2. A boiler of the class described consisting of a plurality of horizontally arranged superimposed hollow water sections through which a heating medium circulates, the said water sections including a major water section having vertical flues therein, intermediate water sections arranged above and below the said major water sections, a bottom water section arranged beneath the lower intermediate water section, a top water section positioned upon the upper intermediate water section, a vertical flue extending from the said bottom water section to the upper intermediate water section, an adjacent flue communicating with said vertical flue and extending through the said intermediate water section and said top section to the outside of the boiler, and means interposed above the vertical flues in the major water section for opening and closing said flues for directing the flow of the products of combustion through said boiler.

3. A boiler of the class described consisting of a plurality of superimposed hollow water sections through which a heating medium circulates, the said water sections including a major water section, having a vertical flue therein, a water grate section arranged below said major water section, a vertical flue extending from beneath the said water grate section to a point above the major water section, an adjacent flue communicating with said vertical flue and extending to the outside of the boiler, and means for controlling the direction of the products of combustion through the said flues.

4. A boiler of the class described consisting of a series of superimposed hollow water sections through which a heating medium circulates, the said water sections including a major water section having a flue opening therein, a water grate section beneath said major section, a flue extending from beneath the said water grate section to a point above the flue opening in the major water section to the outside of the boiler, and means for relatively controlling the direction of the products of combustion through the aforesaid flue openings.

5. A boiler of the class described consisting of a series of superimposed hollow water sections through which a heating medium circulates, the said water sections including a major water section having oppositely arranged flue openings therein, a water grate section located beneath the said major section, an upper water section positioned above the said major water section having a plurality of flues provided therein arranged in staggered relation with regard to the aforesaid flues provided in the major water section, a flue extending from beneath the said water grate section to the outside of the boiler between the major and upper water section, and means for relatively controlling the direction of the products of combustion through the first mentioned flue openings.

6. A boiler of the class described consisting of a series of superimposed hollow water sections through which a heating medium circulates, the said water sections including a major water section having a flue opening therein, a water grate section provided with longitudinally arranged hollow bars spaced from each other, a flue extending from beneath said hollow bars to the outside of the boiler over said major water section, means for controlling the passage of the products of combustion through the flue opening in said major water section into the flue leading to the outside of the boiler, and means located between said water grate and the aforesaid controlling means, for regulating the draft for the consumption of the products of combustion.

7. A boiler of the class described consisting of a series of superimposed hollow water sections through which a heating medium circulates, the said water sections including a major water section having a flue opening therein, a water grate section provided with longitudinally arranged hollow bars spaced from each other, a flue extending from beneath said hollow bars to the outside of the boiler over said major water section, means for controlling the passage of the products of combustion through the flue opening in said major water section into the flue leading to the outside of the boiler, and means including a series of longitudinally arranged bars positioned upon said water grate hollow bars for regulating the relative draft for the consumption of the products of combustion.

8. A boiler of the class described consisting of a series of superimposed hollow water sections through which a heating medium circulates, the said water sections including a fuel compartment, a water grate support for the fuel, a flue arranged above said fuel compartment, another flue extending from beneath the water grate to a point outside of the boiler over said fuel compartment at right angles to the first mentioned flue, and means for directing the upward flow of the products of combustion into the said last mentioned flue, through the flue above the fuel compartment, and for directing the downward passage of the products of combustion through the water grate into the flue extending to the outside of the boiler.

In testimony whereof I affix my signature, in presence of two subscribing witnesses.

HENRY TIELKEMEYER.

Witnesses:
HARRY VOLLMER
J. SIGOLOFF.

Copies of this patent may be obtained for five cents each, by addressing the "Commissioner of Patents, Washington, D. C."